Patented July 19, 1932

1,867,863

UNITED STATES PATENT OFFICE

FRIEDRICH MUTH, OF ELBERFELD, GERMANY, ASSIGNOR TO GENERAL ANILINE WORKS, INC., OF NEW YORK, N. Y., A CORPORATION OF DELAWARE

INDOPHENOL AZINE COMPOUNDS

No Drawing. Application filed December 23, 1930, Serial No. 504,412, and in Germany February 14, 1927.

The present invention relates to new indophenol azine compounds, more particularly it relates to such indophenol compounds of the probable formula:—

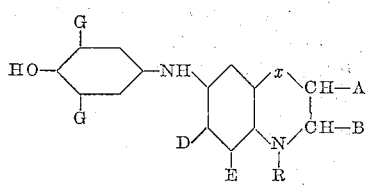

wherein A and B signify hydrogen or methyl or jointly stand for the grouping $-CH_2-CH_2-CH_2-$, $-CH_2-CH_2-CH_2-CH_2-$, or $-CH_2-CH_2-CH_2-CH_2-CH_2-$, D and E stand for hydrogen or jointly for the grouping $-CH=CH-CH=CH-$ or $-CH_2-CH_2-CH_2-CH_2-$, G stands for hydrogen or chlorine, R represents hydrogen or methyl and $x$ means oxygen or sulfur.

In accordance with the present invention the new compounds are produced by joint oxidation of a compound of the general formula:—

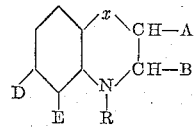

wherein A, B, D, E, R and $x$ stand for the above mentioned A, B, D, E, R and $x$, with a para-aminophenol or by condensation of a compound of said type with a quinone halogen imid or with a para-nitrosophenol, to form an indophenol and if desired, treating it with a reducing agent, such as alkali metal sulfide, alkali metal bisulfite or alkali metal hydrosulfide to form the corresponding leuco-compound. Amongst the different processes which lead to my new indophenols, I mention as particularly useful the joint oxidation of these said compounds with a para-aminophenol in aqueous mineral acid solution by means of an alkali metal bichromate, though in certain cases condensation with a quinone-halogen-imid or a para-nitrosophenol might be preferred. Substantially identical indophenolic compounds are, however, produced when using the qualified materials.

My new compounds are generally light-greyish crystalline powders, soluble in warm water, alcohol and sulfuric acid, sparingly soluble in salt solutions. They form colorless solutions with aqueous alkalies, in which the leuco-indophenols are easily oxidized as already in contact with atmospheric oxygen to the corresponding dark colored indophenols. They produce in the polysulfide melt valuable sulfur dyestuffs.

The following examples will illustrate my invention without restricting it thereto:—

*Example 1.*—9,8 kgs. of phenmorpholine, prepared according to the process described in Ber. d. Deutschen Chem. Ges. vol. 55, page 3821, and 8,6 kgs. of para-aminophenol are dissolved in 500 liters of water by the addition of 250 liters of hydrochloric acid of 19,9° Bé.; the solution is well cooled with ice and a solution of 14,5 kgs. of sodium bichromate is allowed to run in. Immediately after the oxidation is complete, 250 liters of an aqueous caustic soda solution of 30% strength is added and the indophenol formed is reduced by means of sodium sulfide until the deep red coloration is converted into the light yellow coloration of the leuco-indophenol. It is then rendered distinctly acid to congo with diluted hydrochloric acid, heated to 60° C. and after the addition of sodium chloride allowed to cool. The leuco-indophenol of the probable formula:—

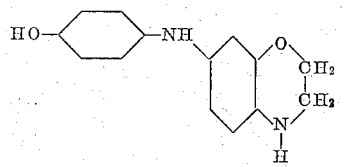

separates as a pale yellowish sandy powder.

It is filtered with suction and washed, advantageously with common salt solution.

The leuco product is soluble in caustic soda solution first to a colorless solution which then rapidly oxidizes in the presence of air accompanied by an intense violet to red coloration.

The alcoholic alkali polysulfide melt of the new leuco-indophenol produces new sulfur dyestuffs, dyeing cotton blue shades.

In an analogous manner new indophenols are prepared from para-aminophenol and 1-methyl-phenylmorpholine, prepared according to the process described in Ber. d. Deutschen Chem. Ges. vol. 32, page 733, having the probable formula:—

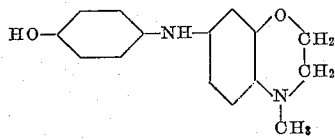

2-methyl-phenmorpholine, prepared according to the process described in Ber. d. Deutschen Chem. Ges. vol. 30, page 1635, having the probable formula:—

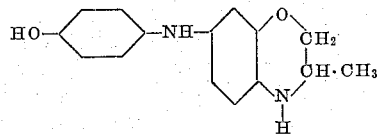

1,2-dimethylphenmorpholine of the probable formula:—

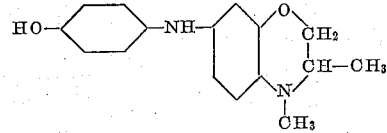

and alpha-beta-naphtho-dihydroisooxazine, prepared according to the process described in Journ. Chem. Soc. London, vol. 121, page 647, of the probable formula:—

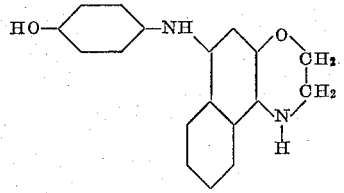

*Example 2.*—20,1 kgs. of phenmorpholine are dissolved as in Example 1 and oxidized with an aqueous suspension of 37 kgs. of the sulfate of 2.6-dichloro-para-aminophenol in an analogous manner as described in Example 1, reduced and separated. The behaviour of the leuco-indophenol of the probable formula:—

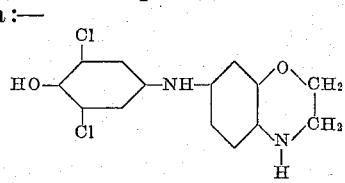

towards aqueous caustic soda solution is analogous to that of Example 1. In an analogous manner from hexahydro-phenoxazine the product of the probable formula:—

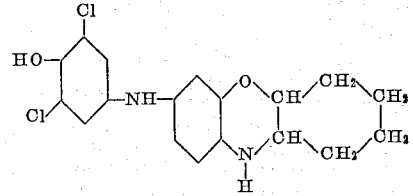

is prepared.

*Example 3.*—10,4 kgs. of 2.3-dihydrobenzene-para-thiazine and 8,6 kgs. of para-aminophenol are condensed as described in Example 1.

The new indophenol of the probable formula:—

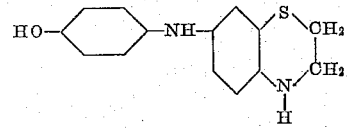

possesses similar properties as the product described in Example 1.

In analogous manner a compound of the probable formula:—

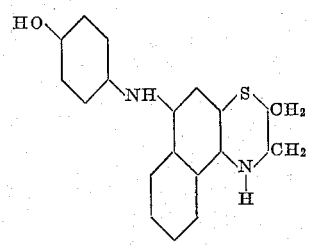

is obtained from alpha-beta-naphtho-dihydroisothiazine.

This is a continuation in part of my co-pending application Serial No. 252,680, filed February 7, 1928.

I claim:—

1. As new products compounds of the probable formula:—

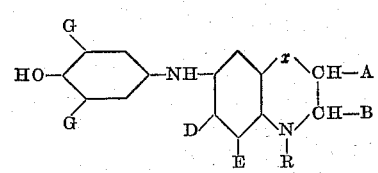

wherein A and B signify hydrogen or methyl or jointly stand for the grouping $-CH_2-CH_2-CH_2$, $-CH_2-CH_2-CH_2-CH_2$ or $-CH_2-CH_2-CH_2-CH_2-CH_2-$, D and E stand for hydrogen or jointly for the grouping $-CH=CH-CH=CH-$ or $-CH_2-CH_2-CH_2-CH_2-$, G stands for hydrogen or chlorine, R represents hydrogen or methyl and $x$ means oxygen or sulfur, being generally light-greyish crystalline powders, soluble in warm water, alcohol and sulfuric acid, sparingly soluble in salt solutions, forming colorless solutions with aqueous alkalies, in which the leuco-indophenol is easily oxidized to the corresponding dark colored indophenol and producing in the polysulfide melt very valuable sulfur dyestuffs.

2. As a new product the compound of the formula:

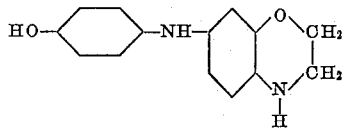

being a light greyish crystalline powder, soluble in hot water, alcohol and mineral acids, sparingly soluble in salt solutions, forming colorless solutions with aqueous alkalies, in which the leuco-indophenol is easily oxidized to the corresponding dark colored indophenol, producing in the polysulfide melt a very valuable sulfur dyestuff.

3. As a new product the compound of the formula:—

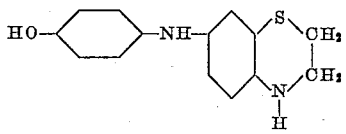

being a light greyish crystalline powder, soluble in hot water, alcohol and mineral acids, sparingly soluble in salt solutions, forming colorless solutions with aqueous alkalies in which the leuco-indophenol is easily oxidized to the corresponding dark colored indophenol, producing in the polysulfide melt a very valuable sulfur dyestuff.

In testimony whereof, I affix my signature.

FRIEDRICH MUTH.